(12) United States Patent
Zielke et al.

(10) Patent No.: US 9,976,651 B2
(45) Date of Patent: May 22, 2018

(54) DEVICE TO CREATE A HERMETIC SEAL FOR LARGE OPENINGS IN EQUIPMENT

(75) Inventors: Jörg Zielke, Horgenzell (DE); Paul B. Kroehl, Weingarten (DE); Klaus Stanke, Weingarten (DE)

(73) Assignee: Andritz Technology and Asset Management GmbH, Graz (AT)

( * ) Notice: Subject to any disclaimer, the term of this patent is extended or adjusted under 35 U.S.C. 154(b) by 1512 days.

(21) Appl. No.: 13/695,992

(22) PCT Filed: Mar. 25, 2011

(86) PCT No.: PCT/AT2011/000149
§ 371 (c)(1),
(2), (4) Date: May 13, 2013

(87) PCT Pub. No.: WO2011/137468
PCT Pub. Date: Nov. 10, 2011

(65) Prior Publication Data
US 2013/0228981 A1    Sep. 5, 2013

(30) Foreign Application Priority Data
May 3, 2010 (AT) .................................. A 742/2010

(51) Int. Cl.
| | |
|---|---|
| *F16J 15/06* | (2006.01) |
| *F28F 9/00* | (2006.01) |
| *F28F 9/013* | (2006.01) |
| *F28F 9/10* | (2006.01) |
| *F28F 9/12* | (2006.01) |
| *B65D 45/10* | (2006.01) |
| *B65D 45/02* | (2006.01) |
| *B65D 45/16* | (2006.01) |

(52) U.S. Cl.
CPC ................. *F16J 15/06* (2013.01); *F28F 9/00* (2013.01); *F28F 9/013* (2013.01); *F28F 2280/02* (2013.01)

(58) Field of Classification Search
CPC ... F16J 15/06; F16J 15/061; F28F 9/00; F28F 9/013; F28F 9/10; F28F 9/12; B65D 45/10; B65D 45/02; B65D 45/16
USPC .................................................. 220/325, 327
See application file for complete search history.

(56) References Cited

U.S. PATENT DOCUMENTS

| | | | | |
|---|---|---|---|---|
| 3,018,127 | A * | 1/1962 | Dobrosielski | ............ F16J 13/18 220/327 |
| 5,110,369 | A * | 5/1992 | Tornstrom | ............ H01L 31/048 136/244 |
| 5,348,267 | A * | 9/1994 | Lanting | ................... F16F 15/08 248/635 |
| 6,735,912 | B2 * | 5/2004 | Riggio | ....................... E04D 3/08 52/235 |
| 8,602,245 | B2 * | 12/2013 | Manahan | ................ F42B 39/00 220/315 |

* cited by examiner

*Primary Examiner* — Andrew T Kirsch
(74) *Attorney, Agent, or Firm* — Alix, Yale & Ristas, LLP

(57) ABSTRACT

The invention refers to a device to create a hermetic seal for large openings in equipment subject to low pressure. According to the invention it is characterized by at least one sealing cover being provided, which is pressed onto the side wall of the equipment by means of bolts, where the bolts are welded to a strip attached to the side wall at the edge of the opening in the equipment. This provides a good, low-cost and hermetic seal.

20 Claims, 5 Drawing Sheets

DEVICE TO CREATE A HERMETIC SEAL FOR LARGE OPENINGS IN EQUIPMENT

The invention relates to a device to create a hermetic seal for large openings in equipment subject to low pressure.

In order to seal openings in equipment, round flanges are normally welded into the opening and a suitable cover with seals is applied. To prevent the seal surfaces from warping, they must have a substantial material thickness and also be machined. For pressure vessels in the medium and high pressure range, the material must be very thick in any case in order to lend the equipment the required strength. At low pressures and for equipment used in air engineering systems, the wall thickness is only a few millimeters and thus cannot guarantee that the sealing surfaces are rigid enough and free of warping, particularly for large, mainly rectangular opening cross-sections. Large cross-sections are needed for assembly and access ports, for example, or for built-in components such as agitators and heat exchangers.

The aim of the invention is thus to create a device that guarantees a simple, low-cost and hermetic seal at low pressures.

The invention is thus characterised by at least one sealing cover being provided, which is pressed onto the side wall of the equipment by means of bolts, where the bolts are mounted in a strip attached to the side wall at the edge of the opening in the equipment, where the opening can advantageously have a rectangular shape. When the device according to the invention is used, the low wall thickness required by the engineering design can be retained, while still achieving a hermetic seal. In particular, there is no need for laborious machining of the sealing surface on the vessel side. This results in an economical advantage in the equipment design.

It has proved particularly favourable if the strip is pressed onto the side wall by means of U-shaped profiles. This ensures that it is pressed on evenly.

A favourable further embodiment of the invention is characterised by the sealing cover having a groove for a soft seal. This provides a very good hermetic seal.

If there are several openings with sealing covers, it is particularly advantageous if sealing covers that are close together are clamped to a shared profile.

A favourable embodiment of the invention is characterised by the bolts being pushed or screwed into the strip, where the bolts can either be glued or welded to the strip.

The invention proves particularly advantageous if the sealing cover is part of a heat exchanger stack, where the heat exchanger stack can be aligned precisely with the aid of running rails and adjustable suspension rollers in such a way that the sealing cover is plane-parallel to the side wall.

Figure 1:
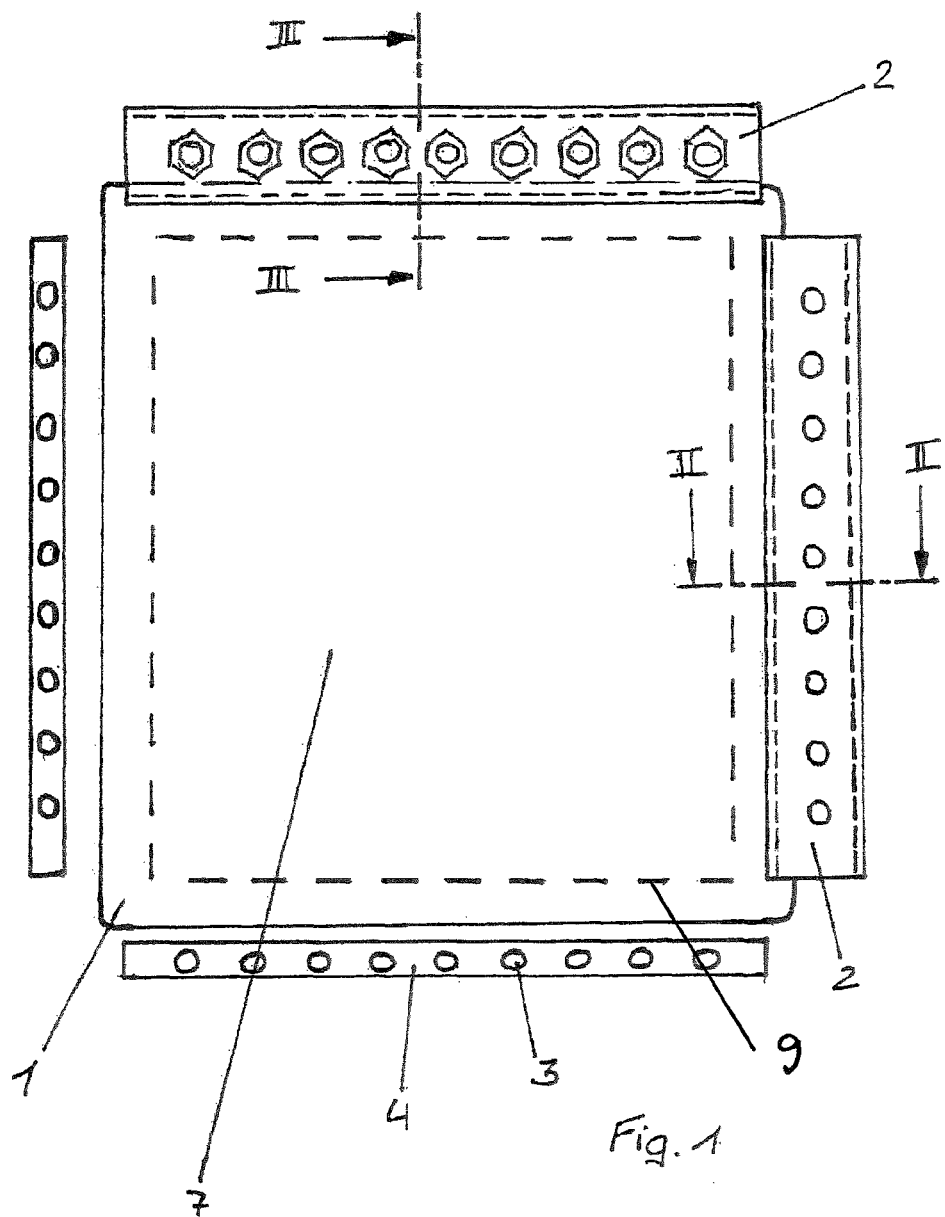
Figure 2:
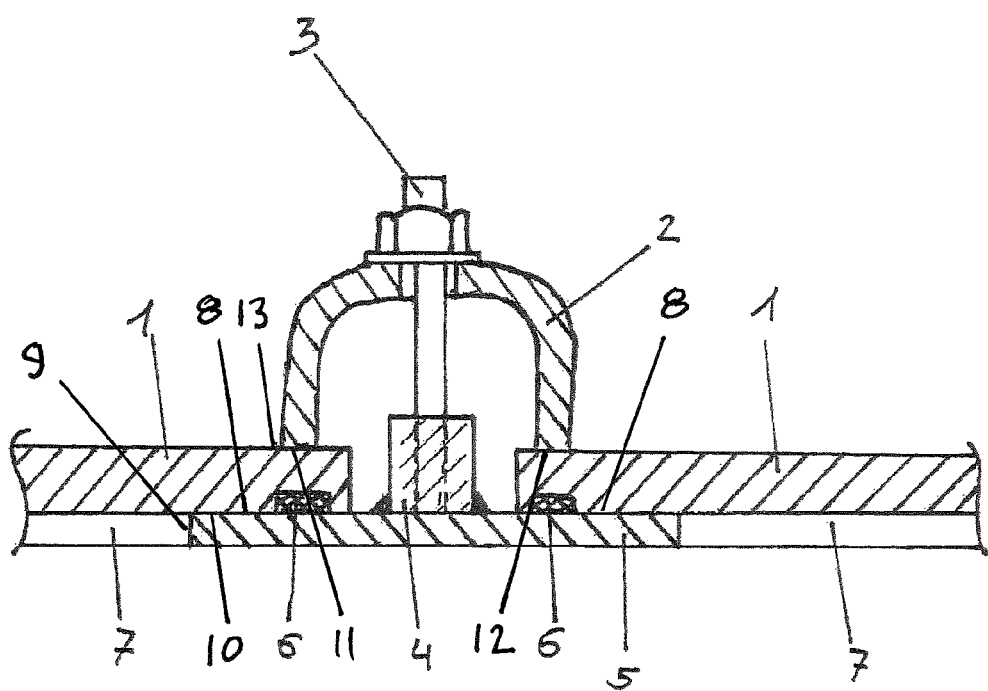
Figure 3:
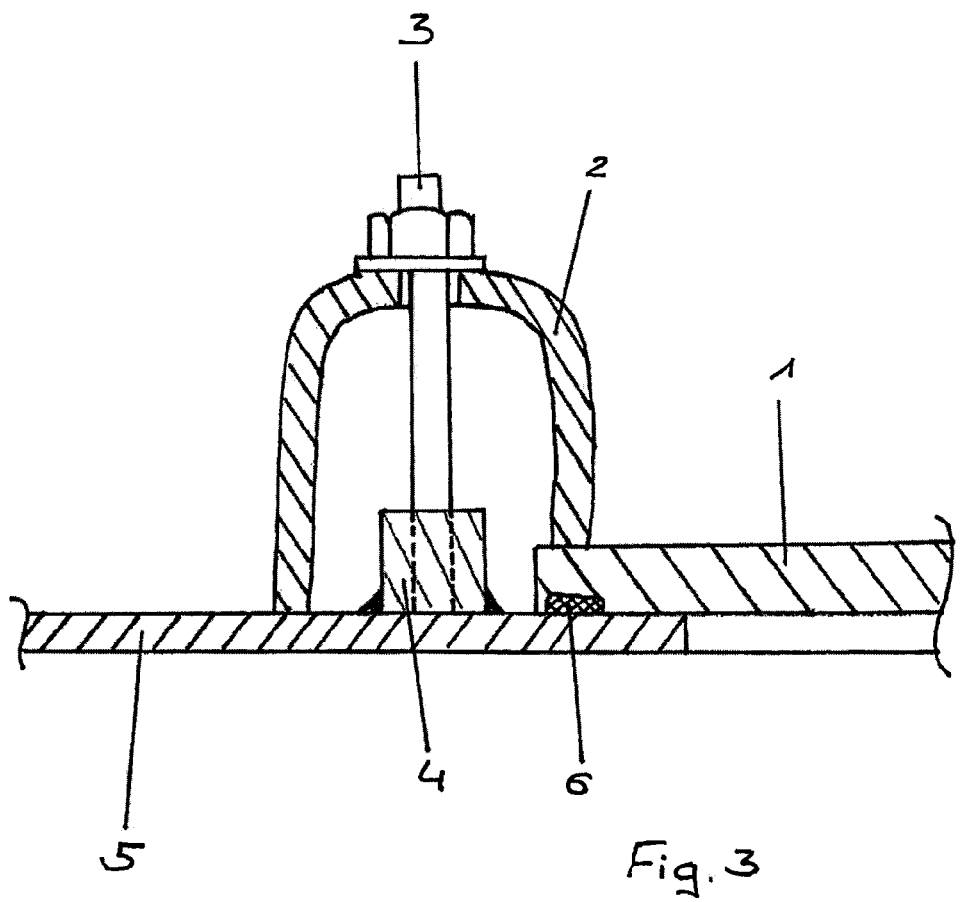
Figure 4:
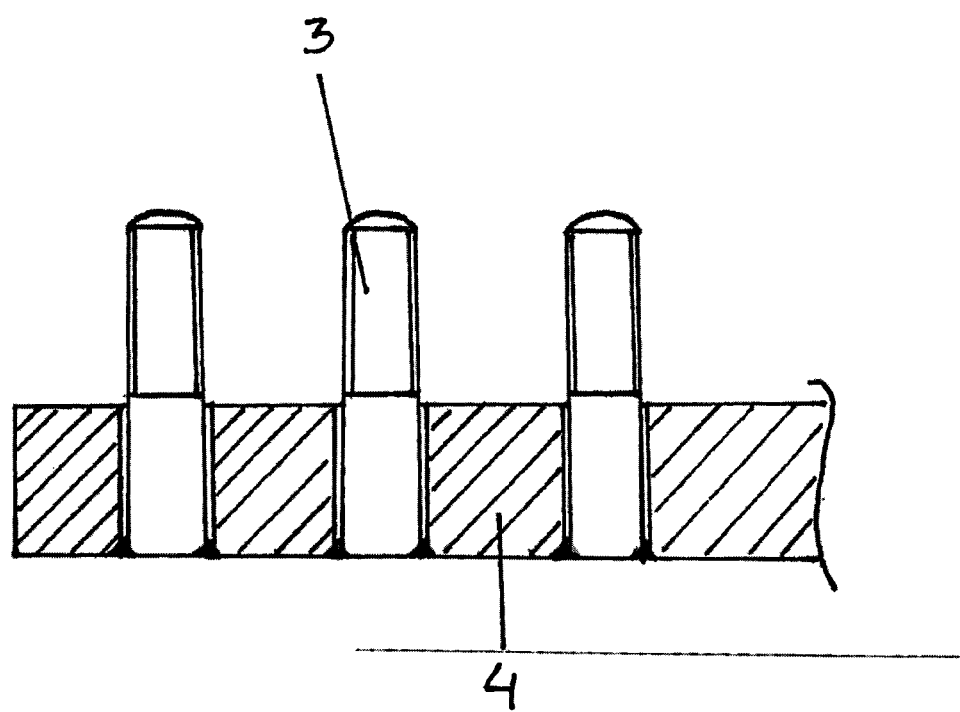
Figure 5:
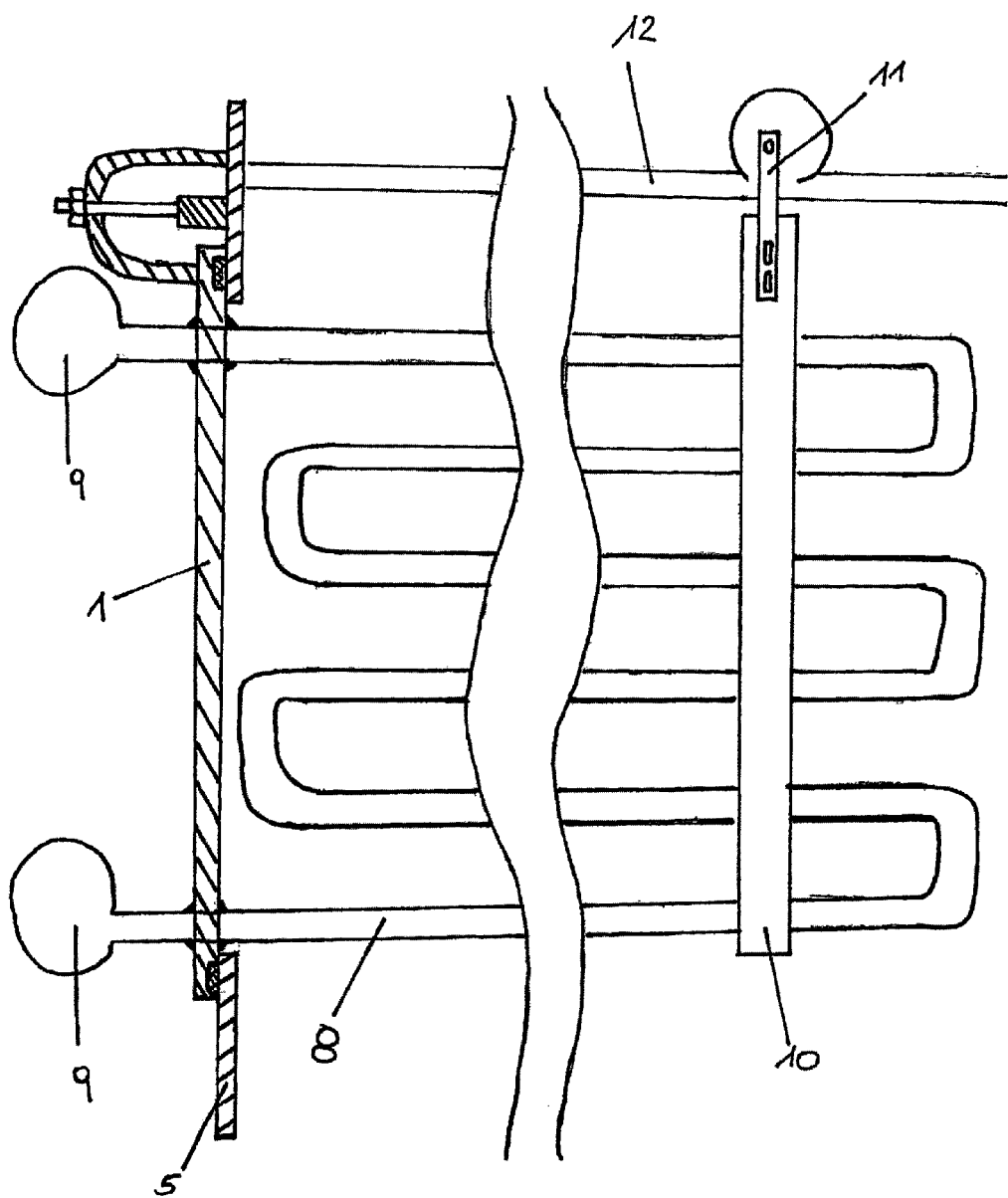

The invention will now be described in examples and referring to the drawings, where FIG. 1 shows an embodiment of the invention, FIG. 2 shows a sectional view along the line marked II-II in FIG. 1, FIG. 3 shows a sectional view along the line marked III-III in FIG. 1, FIG. 4 shows a sectional view of a strip according to the invention, and FIG. 5 shows a further embodiment of the invention.

FIG. 1 shows a sealing cover 1 that is clamped to the side wall 5 by means of U-shaped profiles 2 using bolts 3 that are welded to a strip 4. The strips 4 are welded to the side wall at the edge of the openings 7 and thus reinforce the sealing area of the side wall. Together with the U-shaped profiles 2, this creates an extremely rigid structure for the sealing area.

FIG. 2 shows a sectional view along the line marked II-II in FIG. 1, where two openings 7 are visible here. The strip 4 is welded to the side wall 5 of the equipment. For sealing purposes there is a U-shaped profile 2 that is connected to the strip 4 by bolts 3 and presses both sealing covers 1 onto the side wall 5. A soft seal 6 placed in the circumferential cover groove in the cover levels out any remaining imprecision in the surface and thus provides a hermetic seal at the opening(s) 7. For openings adjacent to one another, clamping can be achieved in a space-saving arrangement by using a shared U-shaped profile 2 which then has side sections of the same height. In contrast, the side sections for clamping directly to the side wall 5 are not the same height (as also shown in FIG. 3 (sectional view along the line marked III-III in FIG. 1).

The strips 4 have the twin function of stiffening and clamping. Advantageously they have a high, or at least a square cross-section. The bolts 3 are placed or screwed into the holes and welded into place from the rear (see FIG. 4). The strips are then welded to the side wall by means of simple fillet welds following any aligning work that may be necessary.

If there are not only openings 7 to be closed off, but also heat exchanger stacks, for example, that are to be pushed into the equipment from the side, additional measures are required. As shown in FIG. 5, it is advantageous if the heat exchangers also have a sealing plate 1 at their outer end, as described above. The inlet and outlet of the pipe coils 8 lead into collection pipes 9 on the outside. The passages through the sealing plate 1 are seal-welded. At their inner end the pipe coils 8 are secured to a holding frame 10. This holding frame 10 can be connected directly to the sealing plate 1 by means of stiffener plates (not shown), which results in a compact unit. If the insertion depths are large, however, the reinforced side wall 5 according to the invention is not able to withstand the bending weights. As a remedial measure, the side walls facing one another are connected by means of running rails 12, which alone provide some reinforcement. Furthermore, the holding frame 10 of the heat exchanger is suspended from the running rails 12 on adjustable rollers 11. When the heat exchanger stack has been pushed into the equipment, the sealing plate 1 can be aligned plane-parallel to the side wall 5 and thus is not exposed to any additional moments of flexion that cause leakage. The sealing plate is secured in place and sealed by means of U-shaped profiles 2 and strips with bolts 4 according to the invention, as described above.

As is evident in, for example, FIGS. 1 and 2, the margin 8 of the external surface of the wall around the opening defines a closed perimeter of the edges 9 of the opening (in this case rectangular), which penetrates transversely through the sidewall. A single sealing cover 1 completely covers the closed perimeter and extends beyond the edges of the opening, with the inner surface 10 of the cover margin resting on the margin 8 of the external surface of the wall completely around the opening. A plurality of distinct rigid strips 4 are attached to the external surface of the wall around the opening, at a respective plurality of positions spaced adjacent to the margin of the cover. A clamp 2 and a plurality of tensioned bolts 3 are operatively associated with each rigid strip, whereby the inner surface 10 of the cover margin is pressed and sealed against the margin 8 of the external surface of the wall around the entire perimeter of the opening.

The cover 1 extends parallel to the wall 5, whereas each strip 4, the plurality of bolts 3 in the strips, and the legs of the clamps 2 extend in a direction that is perpendicular to the external surface of the wall. Each clamp has two legs with respective feet 11, 12. One foot bears on the outer surface 13 of the cover margin and the other foot bears (in FIG. 2) on the outer surface margin of another cover. The tensioned bolts 3 draw the margins 8 of the external surfaces of the walls around the openings toward the clamp while pressing one foot 11 of the clamp against the outer surface 13 of one cover and the other foot 12 against the external surface of the other cover margin such that the margins of the cover and the margins of the walls around the openings are pressed together.

The invention claimed is:

1. A hermetic seal device over an opening with edges penetrating transversely through a pressure barrier side wall of equipment in which the side wall defines external and internal surfaces of the equipment, comprising:
a sealing cover having a margin extending beyond the edges of the opening, with an inner surface of the cover margin resting on a margin of the external surface of the wall around the opening, and with an exposed, outer surface of the cover margin;
a distinct rigid strip attached to said external surface of the wall around the opening, at a position spaced adjacent to the margin of the cover;
a distinct inverted U-shaped clamp having one leg with one foot bearing on the outer surface of the cover margin and another leg with another foot bearing either on an outer surface of the margin of another cover or on said external surface of the wall around the opening;
a plurality of tensioned bolts in said rigid strip, engaging the U-shaped clamp;
whereby the tensioned bolts draw the margin of the external surface of the wall around the opening toward the clamp while pressing said one foot of the clamp against the outer surface of the cover margin such that the inner surface of the cover margin is pressed and sealed against the margin of the external surface of the wall around the opening.

2. The device according to claim 1, wherein the opening has a rectangular shape.

3. The device according to claim 1, wherein the sealing cover has a groove for a soft seal.

4. The device according to claim 1, wherein a single clamp bears on the outer surface margins of two sealing covers over a respective two adjacent openings.

5. The device according to claim 1, wherein the bolts are pushed or screwed into the strip.

6. The device according to claim 5, wherein the bolts are either glued or welded to the strip.

7. The device according to claim 1, wherein the sealing cover is part of a heat exchanger stack.

8. The device according to claim 7, wherein the heat exchanger stack is supported by adjustable suspension rollers for aligning precisely with running rails within the equipment in such a way that the sealing cover is plane parallel to the side wall.

9. The device according to claim 1, wherein
the sealing cover that covers the opening extends parallel to said wall;
the plurality of bolts project from the strip perpendicularly relative to the wall; and
said inverted U-shaped clamp cooperates with the bolts to press said feet perpendicularly against the cover and thereby press the cover perpendicularly against said wall.

10. The device according to claim 9, wherein the opening has rectangular edges and a strip is attached to the wall adjacent each edge.

11. The device according to claim 10, wherein a groove is provided in the cover where the cover extends beyond the edge of the opening and a soft seal is provided in the groove and loaded by said clamps against the portion of the wall surrounding the opening.

12. The device according to claim 9, wherein a groove is provided in the cover where the cover extends beyond the edge of the opening and a soft seal is provided in the groove and loaded by said clamps against the portion of the wall surrounding the opening.

13. The device according to claim 9, wherein the strips are welded onto the wall and the bolts are rigidly connected to the strips.

14. The device according to claim 1, wherein the strip is welded to the wall and the bolts are rigidly connected to the strip.

15. The device according to claim 1, wherein
the wall has two of said openings, on either side of an intermediate wall portion;
one sealing cover is provided over a respective opening, each said cover including a margin;
said strip is rigidly attached to the intermediate wall portion;
a margin of each said cover extends over a respective margin of the intermediate wall portion; and
the inverted U-shaped clamp has one foot bearing on the margin of one said cover and another foot bearing on the margin of the other said cover.

16. The device according to claim 15, wherein strip is welded to the wall and the bolts are rigidly connected to the strip.

17. The device according to claim 1, wherein
said strip is rigidly attached to the wall adjacent to the margin of the cover, having one side facing the margin of the cover and an opposite side facing away from the margin of the cover; and
the inverted U-shaped clamp has one foot bearing on the margin of the cover and another foot bearing on the wall adjacent said opposite side of the strip.

18. The device according to claim 17, wherein the strip is welded to the wall and the bolts are rigidly connected to the strips.

19. The device according to claim 1, wherein
the sealing cover is a flat plate that extends parallel to said wall beyond the edge of the opening onto said margin of the wall;
a plurality of said strips are rigidly attached to the margin around the opening, with each of said strips projecting perpendicularly relative to the wall;
each strip engages a plurality of bolts that project perpendicularly relative to the wall; and
each bolt bears on a respective U-shaped clamp in a direction perpendicular to the wall and thereby presses the cover perpendicularly against the margin of the wall.

20. The device according to claim 1, wherein
the margin of the external surface of the wall around the opening defines a closed perimeter of the edges of the opening;
a single sealing cover completely covers the closed perimeter and extends beyond the edges of the opening, with the inner surface of the cover margin resting on the margin of the external surface of the wall completely around the opening;

a plurality of distinct rigid strips are attached to said external surface of the wall around the opening, at a respective plurality of positions spaced adjacent to the margin of the cover;

a said clamp and a plurality of said tensioned bolts are operatively associated with each rigid strip;

whereby the inner surface of the cover margin is pressed and sealed against the margin of the external surface of the wall around the entire perimeter of the opening.

\* \* \* \* \*